United States Patent
Yi

(10) Patent No.: US 10,346,018 B2
(45) Date of Patent: Jul. 9, 2019

(54) METHOD, APPARATUS AND STORAGE MEDIUM FOR PROCESSING HTML5 CANVAS APPLICATION

(71) Applicant: GUANGZHOU UCWEB COMPUTER TECHNOLOGY CO., LTD., Guangzhou (CN)

(72) Inventor: Xuxin Yi, Guangdong (CN)

(73) Assignee: GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 712 days.

(21) Appl. No.: 14/980,590

(22) Filed: Dec. 28, 2015

(65) Prior Publication Data

US 2016/0162171 A1   Jun. 9, 2016

Related U.S. Application Data

(63) Continuation of application No. PCT/CN2014/079741, filed on Jun. 12, 2014.

(30) Foreign Application Priority Data

Jun. 28, 2013 (CN) .......................... 2013 1 0267709

(51) Int. Cl.
  *G06F 17/00* (2019.01)
  *G06F 3/0484* (2013.01)
  (Continued)

(52) U.S. Cl.
  CPC ........ *G06F 3/04847* (2013.01); *G06F 9/5044* (2013.01); *G06F 17/211* (2013.01); *G06F 17/2247* (2013.01); *G06F 2209/509* (2013.01)

(58) Field of Classification Search
  None
  See application file for complete search history.

(56) References Cited

U.S. PATENT DOCUMENTS 8,913,067 B1 * 12/2014 Kokkevis ............... G06F 9/451
  345/522
9,965,886 B2 * 5/2018 Sorgard ............... G06T 15/005
  (Continued)

FOREIGN PATENT DOCUMENTS

CN   101599009 A   12/2009
CN   101901274 A   12/2010
  (Continued)

OTHER PUBLICATIONS

Boris Smus, "Improving HTML5 Canvas Performance", pp. 1-14, URL<https://www.html5rocks.com/en/tutorials/canvas/performance/> (Year: 2013).*

(Continued)

*Primary Examiner* — Mustafa A Amin
(74) *Attorney, Agent, or Firm* — Alston & Bird LLP

(57) ABSTRACT

The present invention provides a method, an apparatus and a storage medium for processing an HTML5 Canvas application, said method comprising: in the first thread: CPU executes codes of a graphic drawing application to draw each frame of canvas, when it is detected that rendering is needed, all canvas drawing commands of said frame of canvas are cached without executing the corresponding rendering, and when the drawing of said frame of canvas is completed, all the cached canvas drawing commands of said frame of canvas are sent to a second thread; in the second thread, CPU calls GPU to execute all canvas drawing commands of each frame of canvas sent by the first thread, and GPU performs rendering on each frame of canvas according to the canvas drawing commands. The present invention realizes concurrent thread processing by means of caching drawing commands such that JavaScript codes and rendering can be executed simultaneously. As a result, resources of different threads are fully used to greatly increase the response speed of the HTML5 Canvas appli- (Continued)

cation and improve the performance of the HTML5 Canvas application.

10 Claims, 2 Drawing Sheets

(51) Int. Cl.
    *G06F 9/50*     (2006.01)
    *G06F 17/22*     (2006.01)
    *G06F 17/21*     (2006.01)

(56) References Cited

U.S. PATENT DOCUMENTS

| | | | |
|---|---|---|---|
| 2013/0044260 A1* | 2/2013 | Vestergaard | G06F 3/14 348/515 |
| 2013/0103931 A1 | 4/2013 | Bourges-Sevenier | |

FOREIGN PATENT DOCUMENTS

| | | |
|---|---|---|
| CN | 102707928 A | 10/2012 |
| CN | 103399729 A | 11/2013 |

OTHER PUBLICATIONS

David Rousset, "Introduction to the HTML5 Web, Workers: the JavaScript multithreading approach", pp. 1-24, URL<https://www.davrous.com/2011/07/15/introduction-to-the-html5-web-workers-the-javascript-multithreading-approach/> (Year: 2011).*

Office Action for Chinese Application No. 201310267709.3 dated May 22, 2015.

Cong, L. et al., *H5-Flash: An HTML5-Based Flash Runtime*, Computer Applications and Software, vol. 29, No. 2 (Feb. 2012) pp. 169-186 (9 pages of translation).

International Search Report and Written Opinion from International Patent Application No. PCT/CN2014/079741, dated Sep. 17, 2014.

* cited by examiner

METHOD, APPARATUS AND STORAGE MEDIUM FOR PROCESSING HTML5 CANVAS APPLICATION

CROSS-REFERENCE TO RELATED APPLICATION

This application is a continuation of and claims priority to and the benefit of PCT/CN2014/079741, filed Jun. 12, 2014, which claims priority and the benefit of Chinese Patent Application Ser. No. 201310267709.3, filed with the State Intellectual Property Office of P.R. China on Jun. 28, 2013, the content of which is incorporated herein by reference in its entirety.

TECHNICAL FIELD

The present invention relates to the field of mobile communication technologies, and more specifically, to a method, an apparatus and a storage medium for processing an HTML5 Canvas application.

BACKGROUND

The HTML (Hyper Text Markup Language) 5 specification defines a 2D Canvas tag and corresponding Canvas API (Application Programming Interface). When a CPU (Central Processing Unit) is executing a computer program that uses an HTML5 Canvas application, the Canvas tag may be added to a webpage by calling Canvas API to draw 2D graphics. The Canvas tag is only a graphic container used to define graphics including charts and other images. Specific graphic drawings must be completed using scripts, for example, through codes of a graphic drawing application, e.g. JavaScript codes, which is not limited herein.

Specifically, when a CPU is executing a program that uses an HTML5 Canvas application to draw 2D graphics, it executes JavaScript codes to draw the graphics. If a thread in the graphic drawing process needs to call Canvas API to generate images in real time on the web page, then when the CPU calls a canvas drawing command, it immediately performs rendering corresponding to the canvas drawing command by calling GPU (Graphic Processing Unit). When all drawing commands have been called for a frame of canvas, the rendering of the frame of canvas can be completed. When the rendering is completed, the thread continues to execute JavaScript codes to draw the next frame of canvas.

As JavaScript codes and rendering are executed in the same thread, however, the required time is the sum of those for executing the JavaScript codes and rendering. Since rendering of graphics is very time-consuming, it takes a long period of time to complete rendering of each frame of canvas, such that the CPU takes a long time to execute the thread, which lowers the response speed of the HTML5 Canvas application.

BRIEF SUMMARY

In light of the above problem, the object of the present invention is to provide a method, an apparatus and a storage medium for processing an HTML5 Canvas application, implementing concurrent processing by caching drawing commands such that JavaScript codes and rendering are executed simultaneously. As a result, resources of different threads are fully used to greatly increase the response speed of the HTML5 Canvas application and improve the performance of the HTML5 Canvas application.

According to one aspect of the present invention, a method for processing an HTML5 Canvas application is provided, comprising: a first thread, CPU executes codes of a graphic drawing application to draw each frame of canvas, wherein, during the drawing process of each frame of canvas, when it is detected that rendering is needed, all canvas drawing commands of said frame of canvas are cached without executing the rendering corresponding to the canvas drawing commands, and when the drawing of said frame of canvas is completed by executing the codes of the graphic drawing application, all the cached canvas drawing commands of said frame of canvas are sent to a second thread; and a second thread, CPU calls GPU to execute all canvas drawing commands of each frame of canvas sent by the first thread, and GPU performs rendering on each frame of canvas according to the canvas drawing commands.

According to another aspect of the present invention, an apparatus for processing an HTML5 Canvas application is provided, comprising: a first processing unit configured to execute codes of a graphic drawing application to draw each frame of canvas, wherein, during the drawing process of each frame of canvas, when it is detected that rendering is needed, all canvas drawing commands of said frame of canvas are cached without executing the rendering corresponding to the canvas drawing commands, and when the drawing of said frame of canvas is completed, all the cached canvas drawing commands of said frame of canvas are sent to a second processing unit;

A second processing unit configured to call GPU to execute all canvas drawing commands of each frame of canvas sent by the first processing unit, and perform rendering sequentially on each frame of canvas according to the canvas drawing commands.

In addition, the present invention further provides a processor comprising the above described apparatus for processing an HTML5 Canvas application and a computer readable storage medium with program codes executable by the processor, and when the storage medium is executed, the program codes make the processor execute the following two threads, wherein: in the first thread, CPU executes codes of a graphic drawing application to draw each frame of canvas, wherein, during the drawing process of each frame of canvas, when it is detected that rendering is needed, all canvas drawing commands of said frame of canvas are cached without executing the rendering corresponding to the canvas drawing commands, and when the drawing of said frame of canvas is completed by executing the codes of the graphic drawing application, all the cached canvas drawing commands of said frame of canvas are sent to the second thread; and in the second thread, CPU calls GPU to execute all canvas drawing commands of each frame of canvas sent by the first thread, and perform rendering on each frame of canvas according to the canvas drawing commands.

The above method, apparatus and storage medium for processing an HTML5 Canvas application according to the present invention execute steps that are originally executed sequentially in one thread in two concurrent threads by means of caching drawing commands. Namely, in the first thread, CPU caches all canvas drawing commands of each frame of canvas during the drawing process of said frame of canvas; when the drawing of said frame of canvas is completed, sends all the cached canvas drawing commands of said frame of canvas to the second thread; in the second thread, CPU calls GPU to execute all canvas drawing commands of each frame of canvas sent by the first thread, and perform rendering on each frame of canvas according to the canvas drawing commands. As a result, JavaScript codes and rendering are executed simultaneously, resources of different threads are fully used, the response speed of the HTML5 Canvas application is greatly increased, and the performance of the HTML5 Canvas application is improved.

BRIEF DESCRIPTION OF THE DRAWINGS

Figure 1:
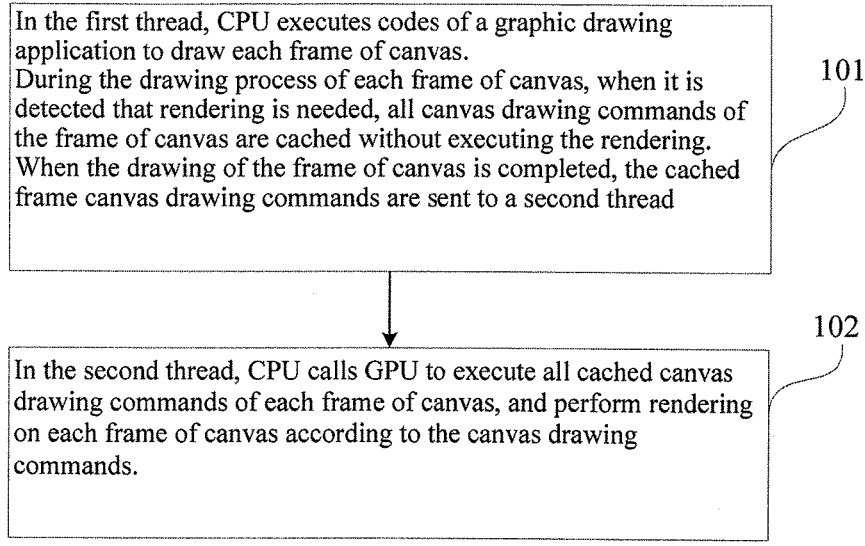
Figure 2:
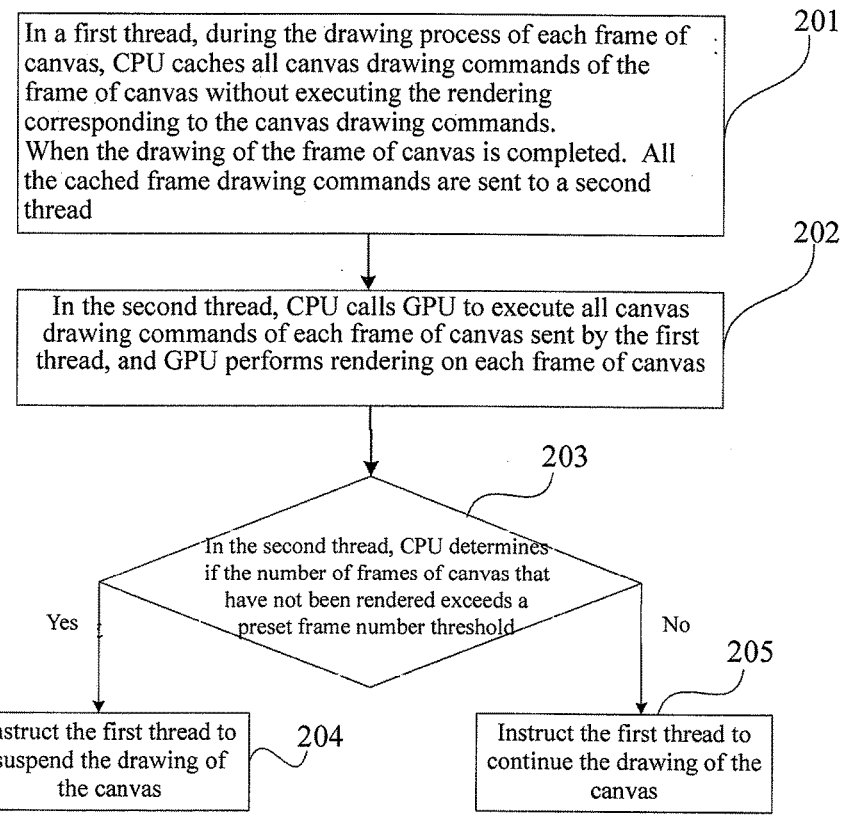
Figure 2A:
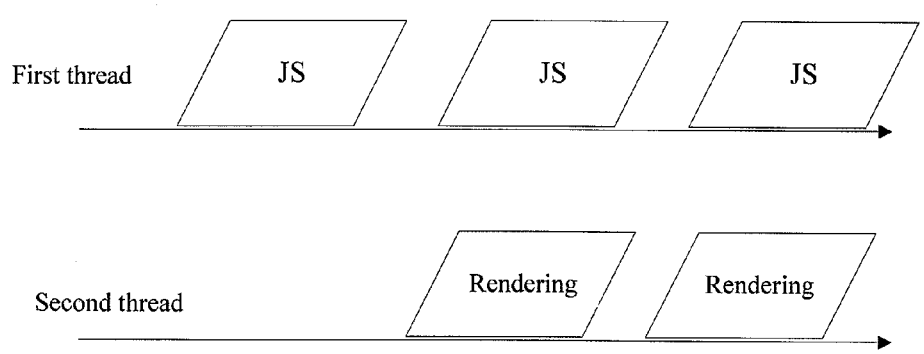
Figure 3:
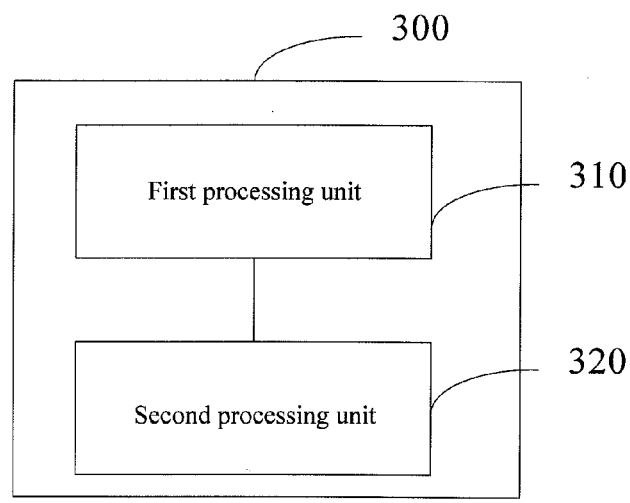

Having thus described the example embodiments of the present invention in general terms, reference will now be made to the accompanying drawings, which are not necessarily drawn to scale, and wherein:

FIG. 1 illustrates a method for processing an HTML5 Canvas application according to one embodiment of the present invention;

FIG. 2 illustrates a method for processing an HTML5 Canvas application according to another embodiment of the present invention;

FIG. 2A illustrates a relationship between a first thread and a second thread of the method for processing an HTML5 Canvas application according to one embodiment of the present invention; and FIG. 3 illustrates an apparatus for processing an HTML5 Canvas application according to an embodiment of the present invention.

DETAILED DESCRIPTION

The present disclosure now will be described more fully with reference to the accompanying drawings, in which some, but not all embodiments of the disclosure are shown. This disclosure may be embodied in many different forms and should not be construed as limited to the embodiments set forth; rather, these example embodiments are provided so that this disclosure will be thorough and complete, and will fully convey the scope of the disclosure to those skilled in the art. Like numbers refer to like elements throughout.

To address the problem in the prior art, embodiments of the present invention make use of the feature that CPU and GPU can run concurrently to transfer the processing of rendering to another process concurrent with the graphic drawing process for execution through the cache processing in a buffer zone, so as to make full use of hardware resources of CPU and GPU and achieve the improvement of performance of an HTML5 Canvas application.

To more clearly describe the technical solution of the present invention, in the description of the present invention, "drawing" performed by CPU through executing codes of a graphic drawing application (e.g. JavaScript codes) is defined as records of Canvas API drawing commands, while "rendering" by GPU is defined as color values of pixels generated by executing the drawing commands, also referred to as rasterization. A complete process to generate images in real time on a web page by using HTML5 Canvas may include drawing of a canvas and rendering after the drawing.

FIG. 1 illustrates a method for processing an HTML5 Canvas application according to a first embodiment of the present invention.

As shown in FIG. 1, the method for processing an HTML5 Canvas application according to the present invention comprises:

Step 101: in a first thread, CPU executes codes of a graphic drawing application to draw each frame of canvas. During the drawing process of each frame of canvas, when CPU detects that rendering is needed, all canvas drawing commands associated with the frame of canvas are cached without executing the rendering corresponding to the canvas drawing commands. To be convenient, all canvas drawing commands associated with a frame of canvas are defined as "frame canvas drawing commands." When drawing process of one frame of canvas is completed, the cached frame canvas drawing commands are sent to a second thread.

The codes of the graphic drawing application are executed by CPU. The executed codes may be JavaScript codes.

Step 102: in a second thread, CPU calls GPU to execute all canvas drawing commands of each frame of canvas. GPU performs rendering on each frame of canvas according to the canvas drawing commands. Namely, GPU generates a color value for each pixel in the Canvas according to the canvas drawing commands corresponding to the Canvas, so as to render the Canvas.

In this embodiment, in the first thread, during the drawing process that CPU executes JavaScript codes to draw each frame of canvas, CPU caches all canvas drawing commands of the frame of canvas that require the calling of Canvas API but does not actually execute them. When the drawing process of the frame of canvas is completed, the cached frame canvas drawing commands are sent to the second thread. In the second thread, CPU calls GPU to execute all canvas drawing commands of each frame of canvas, and according to the canvas drawing commands, GPU performs rendering on each frame of canvas in the sequence of reading the cache, thereby executing steps of JavaScript codes and rendering in two concurrent threads separately to execute JavaScript codes and rendering simultaneously, thus consuming less time than executing two steps sequentially in one thread. As a result, resources of different threads are fully used which greatly increases the response speed of the HTML5 Canvas application and improves the performance of the HTML5 Canvas application.

FIG. 2 illustrates a method for processing an HTML5 Canvas application according to another embodiment of the present invention. As shown in FIG. 2, the method for processing an HTML5 Canvas application according to the present invention comprises:

Step 201: in a first thread, during the drawing process of each frame of canvas, CPU caches all canvas drawing commands of the frame of canvas without executing the rendering corresponding to the canvas drawing commands. When the drawing process of one frame of canvas is completed, the cached frame drawing commands are sent to a second thread.

In the first thread, when CPU detects that rendering is needed, e.g. Canvas API is called, CPU caches the called canvas drawing commands and does not directly execute the rendering process corresponding to the canvas drawing commands. In one exemplary embodiment, all canvas drawing commands of each frame of canvas may be cached by means of cache objects. Specifically, one cache object is created for each frame of canvas. The cache object is directed to a cache zone which cache all canvas drawing commands of the corresponding frame of canvas.

In one specific embodiment of the present invention, cache of drawing commands that are being called is implemented by SkDefferedCanvas, a class provided in the Skia library. All drawing commands that call SkDefferedCanvas can be cached in an internal DefferedDevice command cache zone, which will not be executed until the Flush method of the cache is called. When the Flush method is called, the cache will be cleaned and all cached data in the cache are written into a database device and may be used when CPU calls GPU in the second thread.

In the Skia library, the class SkDefferedCanvas corresponds to the cache object, while DefferedDevice corresponds to the cache zone.

During the process of sending the cached frame canvas drawing commands to the second thread, CPU places the cache object corresponding to each frame of canvas sequentially to the end of the rendering list. The cache zone that the cache object directs to is to cache all canvas drawing commands that are used for rendering.

When CPU completes the drawing of a frame of canvas in the first thread and sends the cached frame canvas drawing commands to the second thread, the first thread will be used to draw the next frame of canvas. At this moment, CPU will create a new SkDefferedCanvas for storing all canvas drawing commands of the next frame of canvas.

In operation, CPU may reuse old SkDefferedCanvas objects that have been executed, for example, creating a number of SkDefferedCanvas for circulated use. The number of SkDefferedCanvas created for circulated use may be n.

Step 202: in the second thread, CPU calls GPU to execute all canvas drawing commands of each frame of canvas sent by the first thread, and GPU responds to the calling and performs rendering on each frame of canvas according to these canvas drawing commands.

During the process of calling GPU by CPU, CPU performs an identification operation from the head of the rendering list to identify the cache object corresponding to each frame of canvas, obtains all canvas drawing commands of the corresponding frame of canvas from the cache zone that the cache object directs to, and calls GPU to perform rendering on each frame of canvas sequentially.

For example, when all canvas drawing commands of frames numbers N+1 to N+4 are sent from the first thread to the second thread, then cache objects corresponding to frames numbers N+1, No. N+2, No. N+3 and No. N+4 to be rendered are sequentially placed to the end of the rendering list. When CPU calls GPU to complete rendering on the canvas frame number N according to the corresponding canvas drawing commands, CPU performs identification operation from the head of the rendering list to identify the cache object corresponding to frame number N+1, obtains all canvas drawing commands of the canvas frame number N+1 from the cache zone that the cache object directs to, and calls GPU to perform rendering on the canvas frame number N+1 according to the corresponding canvas drawing commands. In this manner, all frames of canvas in the rendering list are processed sequentially.

In the second thread, as long as there are cache objects corresponding to canvas to be rendered in the rendering list, CPU continues to call GPU to perform rendering on each frame of canvas sequentially in the "first in and first out" sequence of the rendering list. When there is no cache object to be rendered in the rendering list, CPU will be in the waiting state until the first thread places a cache object corresponding to a frame of canvas in the rendering list again, and CPU will continue to call GPU to perform rendering on the frame of canvas.

Typically, CPU can call GPU to render on each frame of canvas to the layer that the Canvas element corresponds to in the webpage.

Step 203: in the second thread, CPU determines if the number of frames of canvas that have not been rendered exceeds a preset frame number threshold. When it is determined that the number of frames of canvas that have not been rendered exceeds the preset frame number threshold, CPU instructs the first thread to suspend the drawing of the canvas (Step 204). When it is determined that the number of frames of canvas that have not been rendered does not exceed the frame number threshold, CPU instructs the first thread to continue the drawing of the canvas (Step 205).

All code executions are completed by CPU. In the second thread, GPU is called to complete drawing only when drawing commands need to be executed by CPU. After calling the GPU, CPU enters an idle state. GPU returns after the drawing is completed. CPU is reactivated from the idle state and continues execution.

The execution sequence between Step 202 and Step 203 is not limited to the sequence described above.

The frame number threshold may be set to any integer greater than 0 or equal to 0, the specific value may be set at one's discretion in practical applications, which is not limited herein. In the Step 203, the preset frame number threshold is set according to the cache size, in other words, to prevent canvas drawing commands in need of being cached from exceeding the storage capacity of the cache, the drawing speed of the first thread may be limited, i.e. the number of frames of canvas to be rendered. Such a limitation is mainly for balancing data processing speed between the two threads so as to reasonably assign hardware resources occupied by the two threads.

In one embodiment that the preset frame number threshold is 0, when CPU calls GPU to render the canvas frame number N, a cache object corresponding to the canvas frame number N+1 exists in the rendering list. CPU determines that the number of frames of canvas that have not been rendered, which is 1, exceeds the preset frame number threshold, which is 0. CPU then instructs the first thread to suspend the drawing of the canvas. When GPU completes the rendering of the canvas frame number N, CPU begins to call GPU to render the canvas frame number N+1, no cache object corresponding to canvas that have not been rendered exists in the rendering list. CPU determines that the number of frames of canvas that have not been rendered decreases from 1 to 0, and does not exceed the preset frame number threshold, which is 0. It then instructs the first thread to continue the drawing of the canvas.

In the embodiments shown in FIG. 1 and FIG. 2, the relationship between the first thread and the second thread can be determined by referring to FIG. 2A, which will not be repeated herein.

From the embodiment shown in FIG. 2 and the relationship between the first thread and the second thread shown in FIG. 2A, CPU calling GPU to execute canvas drawing commands to render canvas in the second thread and the execution of codes of a graphic drawing application (e.g. JavaScript codes) to draw the canvas in the first thread can be treated as concurrent operations. Execution of JavaScript codes and canvas drawing codes are performed in the first thread. Rendering each frame of canvas is performed in the second thread. The execution in the first thread is performed by CPU. In the second thread, CPU only calls GPU to render canvas, such that CPU and GPU can run concurrently.

According to the prior art, however, CPU calling drawing commands and calling GPU to perform rendering are executed sequentially in one thread. Either CPU calls drawing commands or CPU calls GPU to render canvas. In other words, JavaScript codes and rendering are executed sequentially in the same thread, the required time is the sum of time for executing the JavaScript codes and rendering. Unlike the prior art, embodiments of the present invention realizes concurrent thread processing by means of caching canvas drawing commands to enable JavaScript codes and rendering to be executed simultaneously. As a result, resources of CPU and GPU are fully used to greatly increase the response speed of the HTML5 Canvas application and improve the performance of the HTML5 Canvas application.

The method for processing an HTML5 Canvas application according to the present invention is described with reference to FIG. 1, FIG. 2 and FIG. 2A. Embodiment of the present invention further provides an apparatus to implement the method described above. FIG. 3 illustrates an apparatus for processing an HTML5 Canvas application according to the embodiments of the present invention.

As shown in FIG. 3, the apparatus 300 for processing an HTML5 Canvas application according to the present invention comprises a first processing unit 310 and a second processing unit 320.

The first processing unit 310 is configured to execute codes of a graphic drawing application to draw each frame of canvas. During the drawing process of each frame of canvas, when CPU detects that rendering process is needed, all frame canvas drawing commands are cached without executing the rendering process corresponding to the canvas drawing commands. When the drawing process of the frame of canvas is completed, the cached frame canvas drawing commands are sent to the second processing unit 320.

The second processing unit 320 is configured to call GPU to execute all frame canvas drawing commands sent by the first processing unit 310. GPU performs rendering sequentially on each frame of canvas according to these canvas drawing commands.

During the process that the first processing unit 310 sends the cached frame canvas drawing commands to the second processing unit 320, the cache object corresponding to each frame of canvas is placed sequentially to the end of the rendering list. Cache zone that the cache object directs to is used to cache all frame canvas drawing.

During the process that the second processing unit 320 performs rendering on each frame of canvas according to the canvas drawing commands, the cache object corresponding to each frame of canvas is identified from the head of the rendering list. All frame canvas drawing commands are obtained from the cache zone that the cache object directs to. GPU is called to perform rendering on each frame of canvas according to these canvas drawing commands.

Optionally, the second processing unit 320 may further determine if the number of frames of canvas that have not been rendered exceeds a preset frame number threshold. When it is determined that the number of frames of canvas that have not been rendered exceeds the preset frame number threshold, it instructs the first processing unit to suspend the drawing of the canvas. When it is determined that the number of frames of canvas that have not been rendered does not exceed the frame number threshold, it instructs the first processing unit to continue the drawing of the canvas.

Optionally, the first processing unit 310 may specifically cache all frame drawing commands through SkDefferedCanvas, a class provided in the Skia library.

In this embodiment, during the drawing process of each frame of canvas, the first processing unit 310 caches all frame canvas drawing commands for rendering without executing them. When the drawing process of the frame of canvas is completed, the cached frame canvas drawing commands are sent to the second processing unit 320. The second processing unit 320 calls GPU to execute all frame canvas drawing commands and perform rendering on each frame of canvas sequentially. The two processing units 310 and 320 perform operations in the first and second threads, respectively, thereby executing the steps in two concurrent threads independently, such that JavaScript codes and rendering can be executed simultaneously, and the consumed time is less than the sum of the two executions. As a result, resources of different threads are fully used to greatly increase the response speed of the HTML5 Canvas application and improve the performance of the HTML5 Canvas application.

Moreover, the present invention further provides a processor comprising the above described apparatus for processing an HTML5 Canvas application, and furthermore, the above method for processing an HTML5 Canvas application can also be implemented by a computer program executed by CPU. When the computer program is executed by CPU, the above functions defined in the method for processing an HTML5 Canvas application are executed.

In addition, the above method steps and system units may also be implemented through a controller and a computer readable storage device for storage such that the controller implements computer programs of the above steps or unit functions.

It should be understood that the computer readable storage device herein (e.g. a memory) can be a volatile memory or a non-volatile memory, or may comprise both a volatile memory and a non-volatile memory. As an example rather than limitation, the non-volatile memory may comprise ROM, Programmable ROM (PROM), Electrically Programmable ROM (EPROM), Electrically Erasable Programmable ROM (EEPROM), or a flash memory. The volatile memory may comprise RAM, and said RAM may be used as an external cache memory. As an example rather than limitation, RAM may be obtained in a variety of ways, for example, Synchronous RAM (DRAM), Dynamic RAM (DRAM, Synchronous DRAM (SDRAM), Double Data Rate SDRAM (DDR SDRAM), Enhanced SDRAM (ESDRAM), Synchronous Link DRAM (SLDRAM), and Direct Rambus RAM (DRRAM). The disclosed storage devices intend to include, but not be limited by, these and other proper types of memories.

Those skilled in the art should also understand that various exemplary logic blocks, units, circuits and algorithm steps described by combining the disclosure herein may be realized as electronic hardware, computer software or combinations of the two. To clearly describe such an interchangeability of hardware and software, a general description has been provided in terms of functions of various exemplary assemblies, blocks, units, circuits and steps. Whether such functions are realized as software or hardware is dependent on specific applications and design restrictions applied on the entire system. Those skilled in the art may achieve the functions in a variety of ways according to each specific application, but such a decision of implementation may not be construed as leading to departure from the scope of the present invention.

Various exemplary logic blocks, units, and circuits described by combining the disclosure herein may be realized or executed by using the following components designed to execute the functions herein: general processor, DSP, ASIC, FPGA or other programmable logic devices, discrete gates or transistor logics, discrete hardware parts or any combination of these components. The general processor may be a microprocessor, but alternatively, the processor may be any conventional processor, controller, microcontroller or state machine. The processor may also be realized as a combination of computing devices, such as a combination of DSP and microprocessors, multiple microprocessors, one or more microprocessors combined with DSP core, or any other configurations like this.

Algorithm steps described by combining the disclosure herein may be directly contained in hardware, a software unit executed by a processor or a combination of the two. The software unit may reside in a RAM, flash memory, ROM, EPROM, EEPROM, register, hard drive, portable drive, CD-ROM, or any other form of storage media known in the art. An exemplary storage medium is coupled to a processor such that the processor can read information from or write information into said storage medium. In an alternative solution, the storage medium may be integrated with a processor. The processor and storage medium can reside in ASIC. ASIC can reside in a user terminal. In an alternative solution, the processor and storage medium may reside in a user terminal as discrete components.

In one or more exemplary designs, the functions may be realized in hardware, software, firmware or any combinations thereof. If realized in software, the functions may be stored in a computer readable medium or transmitted via a computer readable medium as one or more commands or codes. The computer readable medium comprises computer storage medium and communication medium, said communication medium comprises any medium that facilitates the transmission of a computer program from one position to another position. The storage medium may be any usable medium that can be accessed by a general or dedicated computer. As an example rather than limitation, the computer readable medium may comprise RAM, ROM, EEPROM, CD-ROM or other laser disc storage devices, magnetic disc storage devices or other magnetic storage devices, or may be any other medium that can be used to carry or store desired programs codes in the form of commands or data structures and can be accessed by a general or dedicated computer or a general or dedicated processor. In addition, any connection may be appropriately referred to as a computer readable medium. For example, if a co-axial cable, optical fiber cable, twisted-pair cable, Digital Subscriber Line (DSL) or a wireless technology, such as IR, radio and microwave, is used to transmit software from a website, server or other remote sources, then the above co-axial cable, optical fiber cable, twisted-pair cable, DSL or the wireless technology, such as IR, radio and microwave, are all included in the definition of medium. As used herein, magnetic disc and laser disc comprise compressed disc (CD), laser disc, CD, DVD, floppy disk, blue ray CD, wherein the magnetic disc typically reproduces data magnetically, while CD uses laser to optically reproduce data. Combinations of the above content should also be included in the scope of computer readable medium.

Although the above disclosure shows the exemplary embodiments of the present invention, it should be noted that, without departing from the scope of the present invention defined by the claims, a variety of changes and modifications may be made. Functions, steps and/or actions of the method claims according to the embodiments of the present invention described herein do not need to be executed in any specific sequence. Moreover, although elements of the present invention may be described or requested in an individual form, they can be assumed to be multiple as well, unless they are specifically limited to be a single one.

The embodiments are all described in a progressive manner, identical or similar parts among the embodiments can see each other, and each embodiment is focused on places that are different from other embodiments. For the system embodiments, in particular, the description is relatively simple since they are substantially similar to the method embodiments. See the description of the method embodiments for related parts thereof.

Many modifications and other example embodiments set forth herein will come to mind to one skilled in the art to which these example embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A computer-implemented method for processing an HTML5 (Hypertext Markup Language) Canvas application, comprising:

in a first thread, executing, by a CPU (central processing unit), codes of a graphic drawing application to draw each frame of canvas, wherein, during the drawing process of each frame of canvas, when it is detected that rendering is needed, all canvas drawing commands of said frame of canvas are cached without executing the rendering corresponding to the canvas drawing commands of said frame, and when the drawing of said frame of canvas is completed by executing the codes of the graphic drawing application, all the cached canvas drawing commands of said frame of canvas are sent to a second thread;

in the second thread, calling, by the CPU, a GPU (graphic processing unit) to execute all the canvas drawing commands of each frame of canvas sent by the first thread, wherein the GPU performs the rendering on each frame of canvas according to the canvas drawing commands;

wherein during the process of sending all the cached canvas drawing commands of said frame of canvas to the second thread, placing a cache object corresponding to each frame of canvas sequentially to an end of a rendering list, wherein a cache zone that the cache object points to is used to cache all canvas drawing commands of the corresponding frame of canvas; and wherein during the process of calling the GPU, the computer-implemented method further comprises: i) identifying, from a head of the rendering list, the cache object corresponding to each frame of canvas, ii) obtaining all canvas drawing commands of the corresponding frame of canvas from the cache zone that the identified cache object points to, and iii) calling the GPU to perform rendering on each frame of canvas according to the obtained corresponding canvas drawing commands.

2. The computer-implemented method for processing an HTML5 Canvas application according to claim 1, further comprises:

determining if the number of frames of canvas that have not been rendered exceeds a preset frame number threshold;

wherein, when the number of frames of canvas that have not been rendered exceeds the preset frame number threshold, instructing the first thread to suspend the drawing of the canvas; and determining that the number of frames of canvas that have not been rendered decreases to not exceed the frame number threshold, instructing the first thread to continue the drawing of the canvas.

3. The method for processing an HTML5 Canvas application according to claim 1, wherein, in the process of caching all canvas drawing commands of said frame of canvas, all canvas drawing commands are cached through SkDefferedCanvas, a class in the Skia library.

4. An apparatus for processing an HTML5 (Hypertext Markup Language) Canvas application, comprising at least one processor and at least one non-transitory storage medium including computer program instruction code, the at least one non-transitory storage medium and the computer program instruction code configured to, with the at least one processor, cause the apparatus to at least:

execute, by a first thread, codes of a graphic drawing application to draw each frame of canvas, wherein, during the drawing process of each frame of canvas, when it is detected that rendering is needed, all canvas drawing commands of said frame of canvas are cached without executing the rendering corresponding to the canvas drawing commands of said frame, and when the drawing of said frame of canvas is completed by executing the codes of the graphic drawing application, all the cached canvas drawing commands of said frame of canvas are sent to a a second thread;

call, by the second thread, a GPU (graphic processing unit) to execute all the canvas drawing commands of each frame of canvas sent by the first thread, wherein the GPU performs the rendering on each frame of canvas according to the canvas drawing commands;

wherein during the process of sending all the cached canvas drawing commands of said frame of canvas to the second thread, the at least one non-transitory storage medium and the computer program instruction code are further configured to, with the at least one processor, cause the apparatus to at least place a cache object corresponding to each frame of canvas sequentially to an end of a rendering list, wherein a cache zone that the cache object points to is used to cache all canvas drawing commands of the corresponding frame of canvas; and wherein during the process of calling the GPU, the at least one non-transitory storage medium and the computer program instruction code are further configured to, with the at least one processor, cause the apparatus to at least i) identify, from a head of the rendering list, the cache object corresponding to each frame of canvas, ii) obtain all canvas drawing commands of the corresponding frame of canvas from the cache zone that the identified cache object points to, and iii) call the GPU to perform rendering on each frame of canvas according to the obtained corresponding canvas drawing commands.

5. The apparatus for processing an HTML5 Canvas application according to claim 4, wherein the at least one non-transitory storage medium and the computer program instruction code are further configured to, with the at least one processor, cause the apparatus to at least determine if the number of frames of canvas that have not been rendered exceeds a preset frame number threshold; wherein, when it is determined that the number of frames of canvas that have not been rendered exceeds the preset frame number threshold, instructing the first thread to suspend the drawing of the canvas; and when it is determined that the number of frames of canvas that have not been rendered decreases to not exceed the frame number threshold, instructing the first thread to continue the drawing of the canvas.

6. The apparatus for processing an HTML5 Canvas application according to claim 4, wherein, in the process of caching all canvas drawing commands of said frame of canvas, all canvas drawing commands of said frame of canvas are cached through SkDefferedCanvas, a class in the Skia library.

7. A processor, characterized in that it comprises the apparatus for processing an HTML5 Canvas application according to any one of claim 4.

8. A processor, characterized in that it comprises the apparatus for processing an HTML5 Canvas application according to any one of claim 5.

9. A processor, characterized in that it comprises the apparatus for processing an HTML5 Canvas application according to any one of claim 6.

10. A computer program product comprising at least one non-transitory computer readable storage medium with program codes stored thereon that, when executed by at least one processor, cause the at least one processor to perform operations for processing an HTML5 (Hypertext Markup Language) Canvas application, comprising:

executing, by a first thread, codes of a graphic drawing application to draw each frame of canvas, wherein, during the drawing process of each frame of canvas, when it is detected that rendering is needed, all canvas drawing commands of said frame of canvas are cached without executing the rendering corresponding to the canvas drawing commands of said frame, and when the drawing of said frame of canvas is completed by executing the codes of the graphic drawing application, all the cached canvas drawing commands of said frame of canvas are sent to a second thread;

calling, by the second thread, a GPU (graphic processing unit) to execute all the canvas drawing commands of each frame of canvas sent by the first thread, wherein the GPU performs the rendering on each frame of canvas according to the canvas drawing commands;

wherein during the process of sending all the cached canvas drawing commands of said frame of canvas to the second thread, the at least one non-transitory storage medium and the program codes are further configured to cause the at least one processor to perform operations comprising: placing a cache object corresponding to each frame of canvas sequentially to an end of a rendering list, wherein a cache zone that the cache object points to is used to cache all canvas drawing commands of the corresponding frame of canvas; and wherein during the process of calling the GPU, the at least one non-transitory storage medium and the program codes are further configured to cause the at least one processor to perform operations comprising: i) identifying, from a head of the rendering list, the cache object corresponding to each frame of canvas, ii) obtaining all canvas drawing commands of the corresponding frame of canvas from the cache zone that the identified cache object points to, and iii) calling the GPU to perform rendering on each frame of canvas according to the obtained corresponding canvas drawing commands.

* * * * *